US 6,749,396 B2

(12) United States Patent
Barry et al.

(10) Patent No.: US 6,749,396 B2
(45) Date of Patent: Jun. 15, 2004

(54) FAILSAFE FILM COOLED WALL

(75) Inventors: Vincent Anthony Barry, Rowley, MA (US); Thomas Edward Demarche, Boxford, MA (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 10/173,009

(22) Filed: Jun. 17, 2002

(65) Prior Publication Data

US 2003/0231955 A1 Dec. 18, 2003

(51) Int. Cl.[7] .................................................. F01D 5/18
(52) U.S. Cl. ...................................... 415/115; 416/97 R
(58) Field of Search ............................. 415/115; 416/95, 416/96 R, 97 R, 241 R, 241 B

(56) References Cited

U.S. PATENT DOCUMENTS

| 4,485,630 | A |   | 12/1984 | Kenworthy |
|---|---|---|---|---|
| 4,916,906 | A |   | 4/1990 | Vogt |
| 5,181,379 | A |   | 1/1993 | Wakeman et al. |
| 5,197,852 | A | * | 3/1993 | Walker et al. ............... 415/115 |
| 5,233,828 | A | * | 8/1993 | Napoli ........................ 60/766 |
| 5,269,653 | A |   | 12/1993 | Evans ....................... 416/97 R |
| 5,356,265 | A |   | 10/1994 | Kercher |
| 5,419,681 | A |   | 5/1995 | Lee |
| 5,749,229 | A |   | 5/1998 | Abuaf et al. |
| 5,780,110 | A |   | 7/1998 | Schaeffer et al. |
| 5,941,686 | A |   | 8/1999 | Gupta et al. |
| 6,039,537 | A | * | 3/2000 | Scheurlen .................. 416/97 R |
| 6,375,425 | B1 |   | 4/2002 | Lee et al. |
| 6,408,610 | B1 |   | 6/2002 | Caldwell et al. |
| 6,511,762 | B1 |   | 1/2003 | Lee et al. |
| 2003/0108424 | A1 | * | 6/2003 | Masaki ...................... 416/97 R |

FOREIGN PATENT DOCUMENTS

DE        3821005        12/1989

OTHER PUBLICATIONS

Application No. 10/028,108, Filed Dec. 20, 2001, Ching–Pang Lee et al (Second citation, with copy).
U.S. patent application Ser. No. 10/028,108, filed Dec. 20, 2001.

* cited by examiner

Primary Examiner—Edward K. Look
Assistant Examiner—Richard A. Edgar
(74) Attorney, Agent, or Firm—Nathan D. Herkamp; Francis L. Conte

(57) ABSTRACT

A flowpath wall is provided for bounding hot combustion gases in a gas turbine engine. The wall includes opposite outer and inner surfaces and a plurality of cooling holes extending therebetween. A thermal barrier coating is bonded to the outer surface and covers blind the holes thereat.

20 Claims, 5 Drawing Sheets

FAILSAFE FILM COOLED WALL

The U.S. Government may have certain rights in this invention pursuant to contract number DAAH10-98-C-0023 awarded by the U.S. Department of the Army.

BACKGROUND OF THE INVENTION

The present invention relates generally to gas turbine engines, and, more specifically, to cooling therein.

In a gas turbine engine air is pressurized in a compressor and mixed with fuel in a combustor for generating hot combustion gases which flow downstream through turbines. A high pressure turbine (HPT) first receives the hot gases from the combustor for extracting energy therefrom for powering the compressor through a corresponding drive shaft therebetween. A low pressure turbine (LPT) follows the HPT and extracts additional energy from the combustion gases for typically powering a fan in a turbofan gas turbine aircraft engine application. The LPT in industrial and marine engine applications may otherwise be used for driving an external drive shaft.

In order to ensure a suitably long life for the engine, the various combustor and turbine components directly subject to the hot combustion gases are typically cooled during operation by bleeding a portion of compressor air for cooling thereof. Cooling in a gas turbine engine is esoteric and quite sophisticated and uses various forms of holes for channeling the cooling air as required for the disparate turbine components requiring cooling.

For example, film cooling holes are common in gas turbine engines and have various configurations typically being inclined through the wall being cooled, with an inlet for receiving the compressor cooling air and an outlet for discharging that air to generate a thin film or boundary layer of air which thermally insulates the wall from the hot combustion gases flowing thereover. The air channeled through the holes provides internal convection cooling of the component wall, with the film generated on the outer surface of the wall effecting a thermally insulating barrier.

Furthermore, it is common to introduce a thermal barrier coating (TBC) in selected areas of various engine components for providing additional thermal insulation for limiting the temperature of the underlying metal or substrate wall being protected.

Combustor liners and turbine components are formed of various superalloy metals having sustained strength at the high temperatures of operation experienced in a gas turbine engine. Efficiency of operation of the engine is maximized by maximizing the temperature of the combustion gases generated therein, but that temperature is limited by the ability to suitably cool all engine components along the flowpath of the hot combustion gases.

Cooling design in a gas turbine engine is made more complex since the engine is operated over various power levels including steady-state and transient operation in which temperature correspondingly changes. And, the combustion gases vary in temperature according to position, and correspond with varying heat transfer loads into the differently shaped engine components.

For example, the typical combustor in a turbofan gas turbine engine includes an annular dome having a plurality of circumferentially spaced apart carburetors in which fuel injectors are mounted in corresponding air swirlers. A fuel and air mixture is discharged from each of the carburetors and ignited for generating the hot combustion gases which correspondingly effect a temperature variation around the circumference of the combustor. Each carburetor therefore generates a locally hot streak of combustion gases which is reduced in circumferential variation at the outlet end of the combustor, yet such circumferential variation in combustion gas temperature nevertheless exists.

The various engine components must therefore be designed for suitable cooling for the hottest expected combustion gas temperature even though those components will normally operate with lower temperature combustion gas. The overall efficiency of the gas turbine engine is therefore limited by the need to provide a nominal amount of cooling air for each component notwithstanding the variation in need for cooling air.

Accordingly, it is desired to provide a flowpath wall in a gas turbine engine having improved cooling features therein.

BRIEF DESCRIPTION OF THE INVENTION

A flowpath wall is provided for bounding hot combustion gases in a gas turbine engine. The wall includes opposite outer and inner surfaces and a plurality of cooling holes extending therebetween. A thermal barrier coating is bonded to the outer surface and covers blind the holes thereat.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
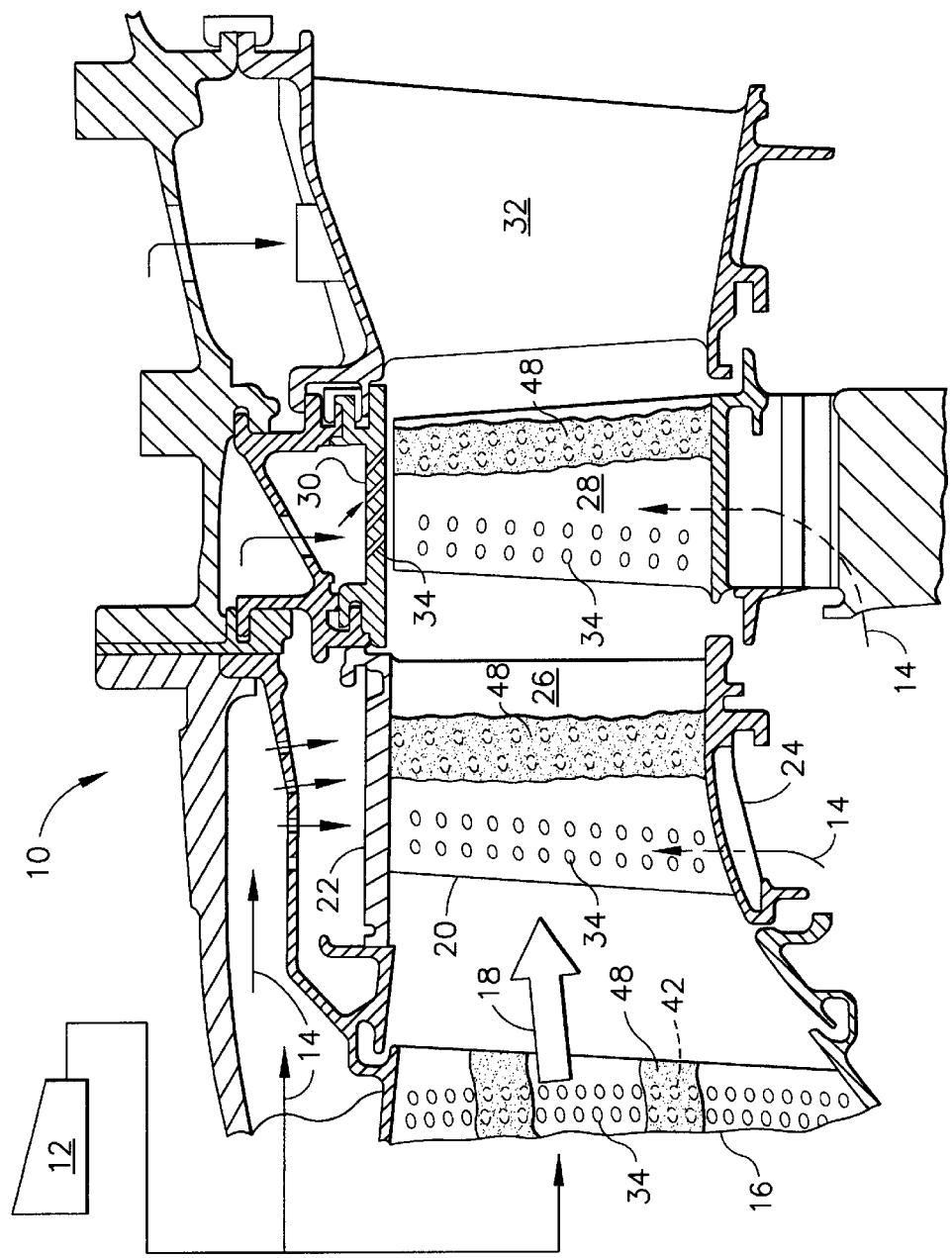
FIG. 1 is a partly sectional axial view of the discharge end of a combustor and turbines in an exemplary aircraft turbofan gas turbine engine in accordance with an exemplary embodiment of the present invention.

Illustrated in FIG. 1 is a portion of an exemplary turbofan gas turbine engine 10 which is axisymmetrical about a longitudinal or axial centerline axis. The engine includes a multistage axial compressor 12 which pressurizes air 14 during operation. Compressor discharge air is then channeled to an annular combustor, shown in aft part, which includes radially outer and inner combustor liners 16 joined together at an upstream dome end (not shown). The combustor dome includes a row of carburetors (not shown) which mix fuel with the pressurized air for generating hot combustion gases 18 during operation.

The combustion gases are channeled downstream through high and low pressure turbines which are respectively used for powering the compressor, and an upstream fan (not shown) in a typical turbofan aircraft engine application.

The high pressure turbine includes a high pressure turbine stator nozzle disposed at the outlet of the combustor. An exemplary embodiment of the nozzle 20 is illustrated in more detail in FIG. 2 and includes radially outer and inner bands 22,24 supporting a row of nozzle stator vanes 26.

The individual vanes have airfoil shapes with opposite pressure and suction sides extending axially between leading and trailing edges. The airfoils are typically hollow and receive a portion of the compressor air 14 through the outer and inner bands for channeling cooling air therein. The cooling air is also used for cooling the outer and inner bands in any suitable manner.

As shown in FIG. 1, the combustion gases are directed by the nozzle 20 downstream to engage a row of first stage rotor blades 28 extending radially outwardly from a supporting disk in the HPT. The turbine blades are shown in more detail in FIG. 3 and have corresponding opposite pressure and suction sides extending between leading and trailing edges, and are typically hollow for receiving another portion of the compressor air 14 therein for cooling thereof during operation.

Figure 4:
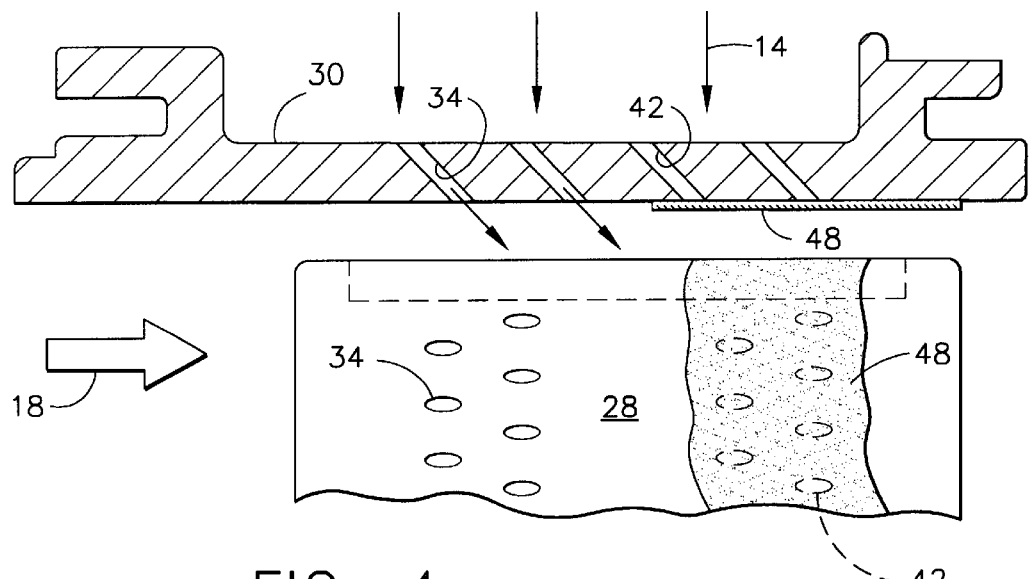
FIG. 4 is an axial sectional view through a turbine shroud illustrated in FIG. 1.

FIG. 1 also illustrates a turbine shroud 30 surrounding the tips of the rotor blades 28 for providing a narrow radial gap therebetween. FIG. 4 illustrates in more detail an exemplary form of the turbine shroud 30 disposed above the blade tips, with the turbine shroud being cooled in any suitable manner using another portion of the compressor air 14.

The first stage rotor blades 28 illustrated in FIG. 1 extract energy from the hot combustion gases for rotating the supporting disk and in turn powering the compressor. The combustion gases are then discharged into a downstream second stage turbine nozzle 32 for in turn flow to additional turbine stages (not shown) in any suitable configuration.

As illustrated in FIG. 1, the hot combustion gases 18 are created inside the combustor and bound by its liners 16 for flow downstream through the various turbine components. Each of the downstream turbine components includes thin walls along which the combustion gases flow during operation, which walls must therefore be protected against the heat of those combustion gases.

The various turbine wall components are formed of various superalloy metals having high strength at elevated temperatures for the gas turbine engine environment. Nevertheless, the individual turbine walls must be suitably cooled during operation for ensuring a suitable life thereof in extended engine operation.

FIGS. 1–5 illustrate these exemplary components of the gas turbine engine all of which may include various patterns and rows of conventional film cooling holes 34. Film cooling holes have various configurations and typically are cylindrical apertures extending through the walls at shallow inclination angles of about twenty degrees (20°) to about forty-five degrees (45°), and ranging in diameter from about 0.25–1.0 mm (10–40 mils).

Figure 2:
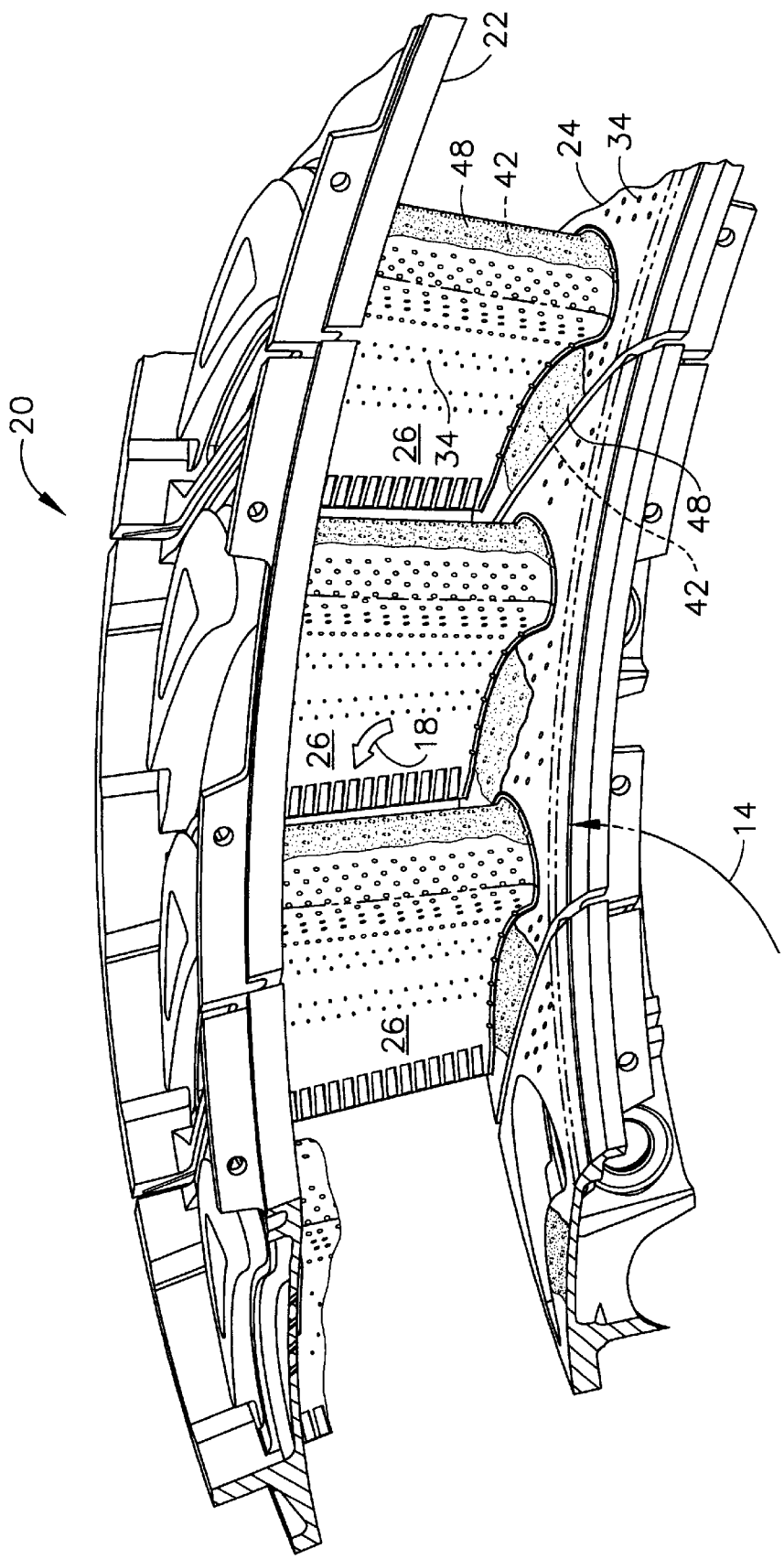
FIG. 2 is a isometric view of a portion of a first stage turbine nozzle illustrated in FIG. 1.

For example, the combustor liners 16 illustrated in FIG. 1 may have various rows of film cooling holes 34 for generating a blanket of cooling air for protecting the exposed surfaces of the liners against the hot combustion gases flowable thereover. In FIGS. 1 and 2, the outer and inner bands 22,24 in the vanes 26 of the turbine nozzle may include various patterns of film cooling holes 34 for providing air insulating layers over the surfaces thereof exposed to the hot combustion gases.

Figure 3:
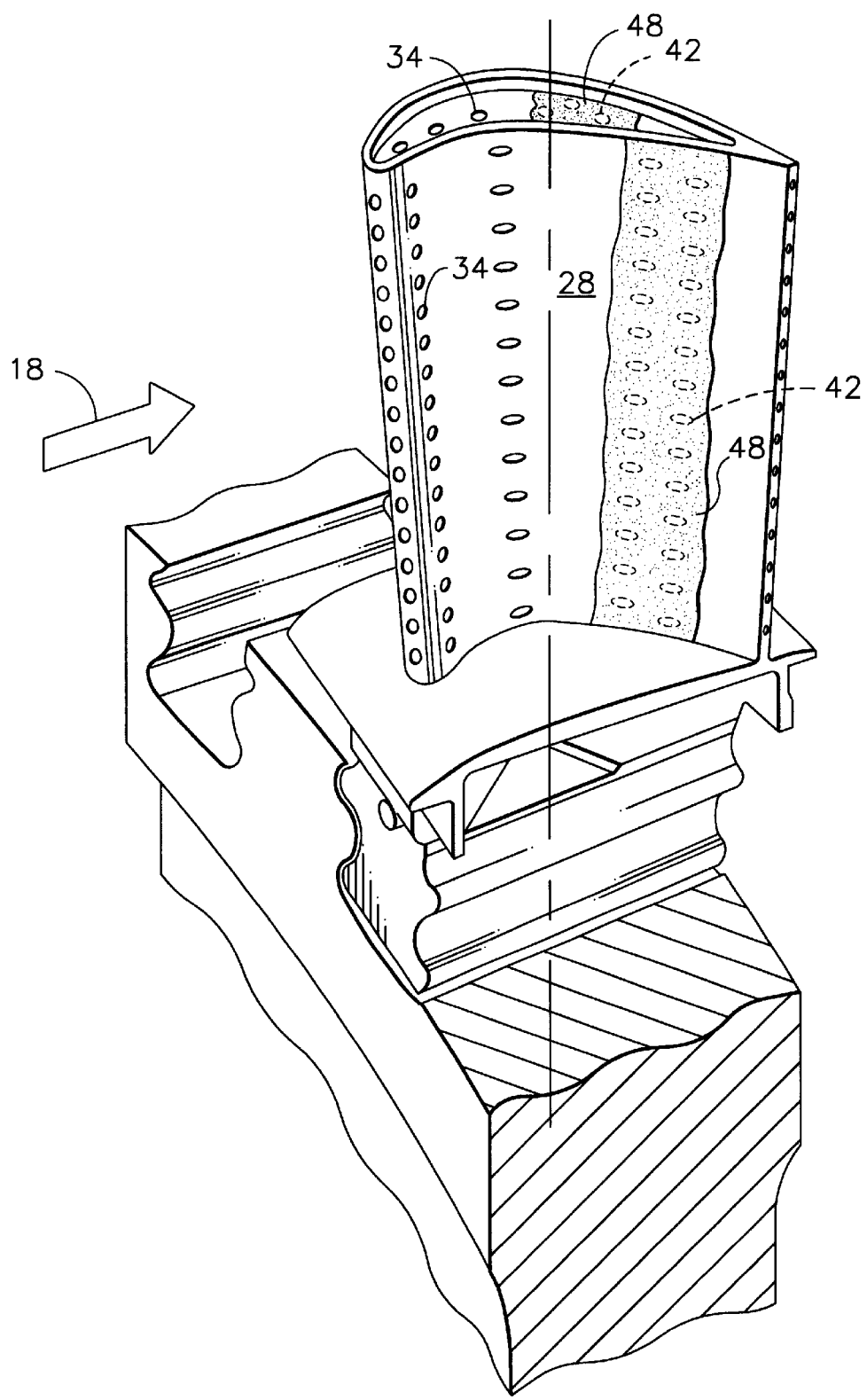
FIG. 3 is an isometric view of a first stage turbine rotor blade illustrated in FIG. 1.

FIG. 3 illustrates that the rotor blades 28 may include various rows of film cooling holes 34 on the exposed pressure and suction side surfaces of the blade, as well as in the blade tip as desired. And, FIG. 4 illustrates the use of additional film cooling holes 34 in the turbine shroud 30 for protecting the exposed surfaces thereof along which the hot combustion gases flow during operation.

Film cooling holes effect cooling by channeling the cooling air through the corresponding walls of the various components which cools the metal components both internally and on the air-sides thereof. And, the discharge from the film cooling holes produces a thin film or blanket of air on the exposed outer surfaces of the components along which the hot combustion gases flow. The air films thusly provide a thermally insulating blanket to additionally protect the various turbine walls from the hot combustion gases.

As indicated above, the film cooling holes are selectively introduced in the various turbine components as required for meeting the expected heat loads from the combustion gas flow thereover. Since the heat loads vary during operation and include steady-state and transient values, the various film cooling holes are typically provided with sufficient cooling capability for the maximum expected temperature of the combustion gases in all possible conditions. Accordingly, for operation at less than maximum combustion gas temperature, excess cooling air is provided which decreases the overall efficiency of the engine.

Further increase in engine efficiency may be obtained by further tailoring the use of film cooling for reducing the amount of air required therefor, without increasing the chance of undesirably high local temperature of the turbine components.

Figure 5:
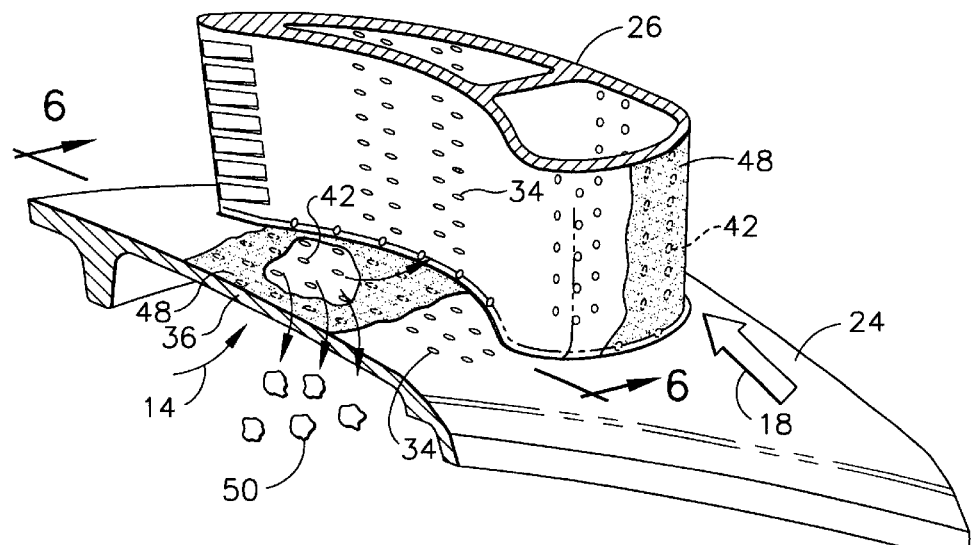
FIG. 5 is a partly sectional isometric view of a portion of the turbine nozzle illustrated in FIG. 2.

In accordance with the present invention, any one of the various gas turbine engine components disclosed above which typically uses conventional film cooling holes 34 may be modified for introducing selective cooling thereof for reducing the need of cooling air therefor. FIG. 5 illustrates an exemplary gas turbine engine flowpath wall 36 found in a portion of the nozzle inner band 24 which includes an improved cooling configuration in accordance with an exemplary embodiment of the present invention. As further described hereinbelow, the flowpath wall 36 may be incorporated in any of the various components of the engine over which hot combustion gases flow during operation.

Figure 6:
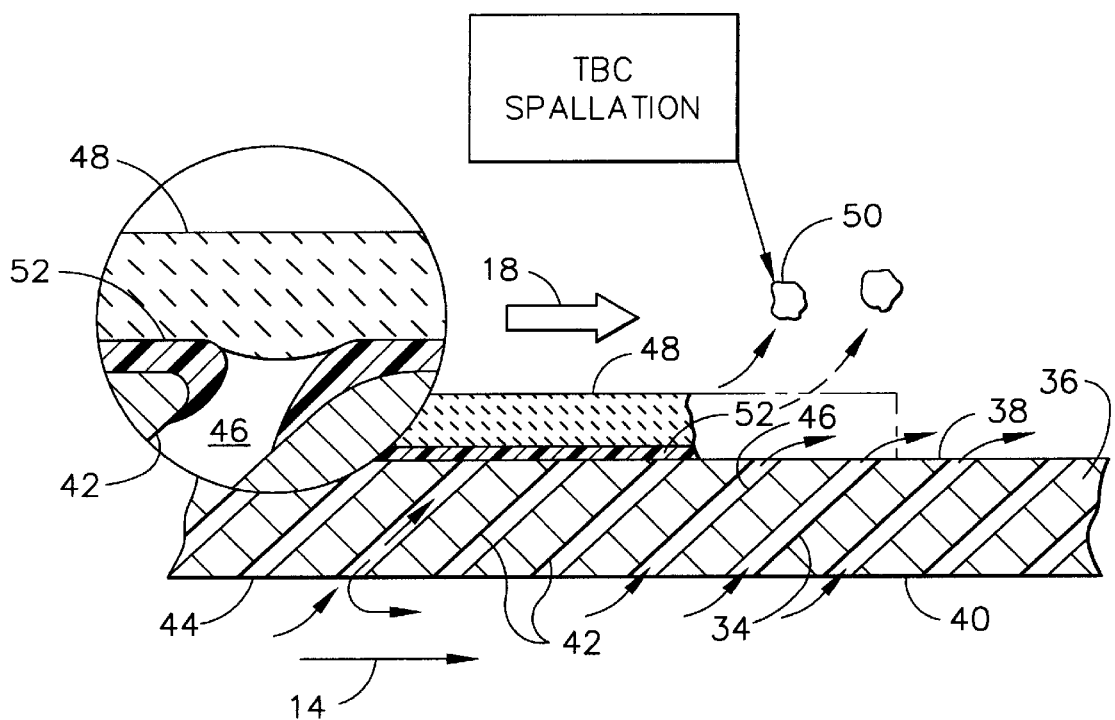
FIG. 6 is an enlarged sectional view through the inner band of the nozzle illustrated in FIG. 5 and taken along line 6—6 including a magnified view of the outlet end of one of several failsafe blind film cooling holes disposed therein in accordance with an exemplary embodiment of the present invention.

The exemplary turbine flowpath wall 36 is illustrated in more detail in FIG. 6. The wall itself may have any suitable thickness as desired for its intended use in the various components of the gas turbine engine, and is typically formed of conventional superalloy metals commonly found in gas turbines. The wall has an outer surface 38 over which the hot combustion gases flow during operation, and an opposite inner surface 40 along which the cooling air 14 may be provided from the compressor.

The wall includes a plurality of inclined failsafe film cooling holes 42 extending between the outer and inner surfaces. The failsafe holes 42 may be identical in configuration to the typical film cooling holes 34 also used in the engine, and may be inclined at any suitable value of about 20°–40°, for example, with internal diameters within the same range as those for the film cooling holes 34. Each failsafe hole 42 includes an open inlet 44 at the wall inner surface 40 for receiving the cooling air 14 thereat, and an opposite outlet 46 disposed at the outer surface 38.

In accordance with the present invention, the flowpath wall 36 further includes a thermal barrier coating (TBC) 48 bonded to the wall outer surface 38 to cover closed or blind the failsafe holes 42 along the outer surface. The thermal barrier coating may have any conventional composition as found in gas turbine engines and, for example, may be yttria stabilized zirconia (YSZ) or $ZrO_2Y_2O_3$, and may be conventionally applied to the various turbine components such as that illustrated in FIG. 2 using plasma vapor deposition or air plasma spray.

In this way, the thermal barrier coating 48 provides thermal insulation against the hot combustion gases 18 during operation, but also closes shut the outlet ends of the failsafe holes 42 effecting blind holes open only at their inlet ends 44.

As shown in FIG. 6, each of the blind holes 42 is preferably hollow between its inlet and outlet ends, substantially unplugged therebetween, and plugged or covered solely at the hole outlet. In this way, the wall includes increased internal surface area due to the blind holes 42 themselves which provides internal cooling of the wall, with the thermal barrier coating 48 insulating the outer surface thereof. And, most significantly, the thermal barrier coating closes the blind holes to prevent discharge of the cooling air through the blind holes which correspondingly decreases the amount of cooling air required during operation.

In a method of using the failsafe film cooling holes 42 illustrated in FIGS. 5 and 6, the combustion gases 18 are channeled over the thermal barrier coating 48 during operation, and the cooling air 14 is channeled over the inner surface 40 of the flowpath wall for cooling thereof, as well as flowing into the blind holes 42 as permitted by their inlets. Then, during operation, local regions of the combustion gases 18 may exceed the temperature capability of the thermal barrier coating to eventually cause spallation thereof wherein flakes 50 of the thermal barrier coating are liberated under spallation and open the initially closed outlets 46 of the failsafe holes 42.

The opened failsafe holes may then operate in the conventional manner of film cooling holes and permit film cooling airflow therethrough for providing enhanced cooling of the wall, including the formation of a cooling air film over the outer surface 38 of the wall in the vicinity of spallation.

Accordingly, the failsafe film cooling holes may be located in areas of high risk of thermal barrier coating spallation and do not permit cooling flow through the holes unless the thermal barrier coating has eroded by spallation for opening the outlet ends of the holes. Overall efficiency of the engine may be increased by eliminating the need for film cooling flow through the failsafe holes 42 during normal operation of the engine, yet in the event of thermal barrier coating spallation the failsafe holes will open for providing additional film cooling to offset the loss of eroded thermal barrier coating.

The turbine flowpath wall will then be provided with enhanced cooling from the open failsafe holes for reducing the risk of premature failure thereof, but at the expense of the use of additional cooling air which will then decrease the engine efficiency. However, during a normal maintenance operation, any turbine component with failed thermal barrier coating which exposes the failsafe holes may then be repaired or replaced as desired for continued use of the engine in service.

In the exemplary embodiment illustrated in FIG. 6, a bond coat 52 firstly covers the wall outer surface 38 in the region of the failsafe holes for enhancing the bonding of the thermal barrier coating thereto. The bond coat 52 is typically relatively thin and may have any conventional composition for use with the specific composition of the desired thermal barrier coating. For example, the bond coat may comprise platinum aluminide (PtAl).

As shown in magnified view in FIG. 6, the individual failsafe holes 42 have relatively large diameters of about 0.25–1.0 mm for use as film cooling holes when exposed. The bond coat 52 is relatively thin, with the hole outlet 46 breaching the bond coat in a typical configuration. The thermal barrier coating 48 is substantially thicker than the bond coat and bridges the hole outlet 46 for closing the outlet and making the failsafe hole a blind passage open only at its inlet 44.

In the preferred embodiment, the hole outlets 46 should be minimally plugged with either the bond coat or thermal barrier coating so that spallation of the thermal barrier coating promptly opens the hole outlet for discharge of the cooling air. It is undesirable to have the thermal barrier coating plug the outlet end of the failsafe holes to any excessive degree therein which would prevent unplugging thereof upon spallation of the thermal barrier coating during locally excessive temperature operation thereof.

The failsafe holes 42 described above may be used in any of the various gas turbine engine flowpath components described for locally selective enhanced cooling thereof. Different components have different cooling requirements, with each component typically having one or more local areas subject to maximum temperature operation. The failsafe holes may therefore be located selectively for corresponding with intended areas of maximum temperature operation or high risk for spallation of thermal barrier coating.

Thermal barrier coatings are gaining increased use in gas turbine engines as the temperature of operation increases for increasing efficiency. Thermal barrier coatings may be used with or without conventional film cooling holes, but in either example the failsafe film cooling holes may now be introduced therewith for providing enhanced performance in the event of thermal barrier coating spallation during operation. The failsafe holes will therefore be uncovered as the thermal barrier coating flakes away, and backup film cooling will then be initiated to offset the loss of cooling previously effected by the thermal barrier coating.

In the exemplary embodiment illustrated in FIGS. 2, 5, and 6 described above, the flowpath wall 36 is in the form of either the turbine nozzle inner band 24, or the corresponding outer band 22 for introducing the failsafe film cooling holes 42 therein. The failsafe holes may be used alone in the bands, or in the exemplary embodiment illustrated in these Figures, may adjoin another pattern of the typical open film cooling holes 34 extending in the flowpath wall.

The normally closed failsafe holes 42 may be integrated in any desired patterns with the normally open film cooling holes 34. The thermal barrier coating will close the failsafe holes 42 during normal operation, and may extend over the portions of the turbine wall including the open film cooling holes 34 which would be normally open through the thermal barrier coating applied thereover.

In FIG. 1 one of the flowpath walls is in the form of the combustor liner 16 having a selective pattern of the failsafe holes 42 covered by the thermal barrier coating 48, and preferably adjoining another pattern of the open film cooling holes 34 extending therethrough. As indicated above, the combustor is subject to hot streaks from the corresponding carburetors thereof, and the failsafe holes 42 and covering thermal barrier coating may be axially aligned with the corresponding carburetors for providing additional protection along the axial flowpaths of the hot streaks.

In FIGS. 2 and 3 the stator vanes 26 and rotor blades 28 are hollow airfoils typically including the normal film cooling holes 34. Yet, both types of airfoils may also include the failsafe holes 42 covered by the thermal barrier coating 48 at any desired location thereof, and in selective patterns as desired for providing additional protection in regions of maximum heat load from the combustion gases.

Furthermore, the blade tip illustrated in FIG. 3 is particularly subject to high heat loads from combustion gas flow thereover during operation, and therefore may include the failsafe holes 42 therein covered by the thermal barrier coating 48.

In FIG. 4, the turbine shroud 30 may also include the failsafe holes 42 covered by the thermal barrier coating 48 in selective patterns with or without the normal film cooling holes 34 which may be provided therein.

The various embodiments disclosed above are common in the use of relatively thin flowpath walls having an outer surface over which the combustion gases flow during operation, and an inner surface provided with cooling air bled from the compressor. The failsafe film cooling holes 42 may have any conventional configuration in the various forms of the flowpath walls as desired for the particular applications thereof in the engine, and are simply covered by the thermal barrier coating to close shut the outlet ends thereof.

The thermal barrier coating therefore provides heat insulation during operation for protecting the corresponding flowpath wall from the hot combustion gases while eliminating the need for pass-through film cooling airflow in the selected locations. Only in the event of thermal barrier coating spallation due to locally excessive temperature will the failsafe film cooling holes be fully opened for channeling the cooling airflow therethrough and providing a protective blanket of cooling air to replace the insulation lost by spallation of the thermal barrier coating. The underlying flowpath wall is therefore protected and ensures effective operation of the engine until the next maintenance event in which the damaged component is repaired or replaced.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine flowpath wall for bounding hot combustion gases comprising:
   opposite outer and inner surfaces; a plurality of inclined failsafe film cooling holes extending therebetween, and each hole including an open inlet at said inner surface for receiving cooling air, and an outlet at said outer surface;
   a bond coat covering said outer surface and extending into said holes around said outlets thereof, with said hole outlets breaching said bond coat;
   a thermal barrier coating bonded to said bond coat and covering blind said holes thereat, and bridging said bond coat around said hole outlets.

2. A wall according to claim 1 wherein said thermal barrier coating is thicker than said bond coat.

3. A wall according to claim 2 wherein said bond coat lines said holes at said outlets thereof and bonds said thermal barrier coating in a bridge extending thereabove.

4. A wall according to claim 3 wherein each of said blind holes is hollow between said inlet and outlet.

5. A wall according to claim 4 in the form of a combustor liner having a pattern of said blind holes adjoining another pattern of open film cooling holes extending therethrough.

6. A wall according to claim 4 in the form of turbine nozzle band having a pattern of said blind holes adjoining another pattern of open film cooling holes extending therethrough.

7. A wall according to claim 4 in the form of an airfoil having a pattern of said blind boles adjoining another pattern of open film cooling holes extending therethrough.

8. A wall according to claim 4 in the form of a turbine shroud having a pattern of said blind holes adjoining another pattern of open film cooling holes extending therethrough.

9. A method of using said turbine flowpath wall according to claim 4 comprising:
   channeling said hot combustion gases over said thermal barrier coating;
   channeling cooling air over said inner surface and into said blind holes; and
   exceeding temperature capability of said thermal barrier coating to cause spallation thereof for opening said hole outlets and permitting film cooling airflow through said open holes.

10. A method according to claim 9 further comprising using both said failsafe film cooling holes and additional film cooling holes open at opposite ends in cooperation therewith.

11. A turbine flowpath wall for bounding hot combustion gases comprising opposite outer and inner surfaces, a plurality of film cooling holes extending therebetween, and a thermal barrier coating bonded to said outer surface by a bond coat extending into said holes and covering blind said holes thereat in a bridge extending across said bond coat.

12. A wall according to claim 11 wherein each of said blind holes includes an open inlet at said inner surface for receiving cooling air, and an outlet at said outer surface being closed by said thermal barrier coating.

13. A wall according to claim 12 wherein each of said blind holes is hollow between said inlet and outlet.

14. A wall according to claim 13 wherein said thermal barrier coating is thicker than said bond coat.

15. A wall according to claim 14 wherein said bond coat lines said holes at said outlets thereof and bonds said thermal barrier coating in a bridge extending thereabove.

16. A wall according to claim 14 in the form of a combustor liner having a pattern of said blind holes.

17. A wall according to claim 14 in the form of a turbine nozzle band having a pattern of said blind holes.

18. A wall according to claim 14 in the form of an airfoil having a pattern of said blind holes.

19. A wall according to claim 14 in the form of a turbine shroud having a pattern of said blind holes.

20. A method of using said turbine flowpath wall according to claim 14 comprising:
   channeling said hot combustion gases over said thermal barrier coating;
   channeling cooling air over said inner surface and into said blind holes; and
   exceeding temperature capability of said thermal barrier coating to cause spallation thereof for opening said hole outlets and permitting film cooling airflow through said open holes.

* * * * *